(12) United States Patent
Zakaria et al.

(10) Patent No.: US 11,088,946 B2
(45) Date of Patent: Aug. 10, 2021

(54) SYSTEM AND METHOD TO SEPARATELY ROUTE CELLULAR VOICE AND DATA TRAFFIC TO DIFFERENT LOCATIONS WITH A SATELLITE BACKHAUL

(71) Applicants: Gaguk Zakaria, College Park, MD (US); Bhanu Durvasula, Potomac, MD (US)

(72) Inventors: Gaguk Zakaria, College Park, MD (US); Bhanu Durvasula, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/489,962

(22) Filed: Apr. 18, 2017

(65) Prior Publication Data
US 2018/0205639 A1    Jul. 19, 2018

Related U.S. Application Data

(60) Provisional application No. 62/448,298, filed on Jan. 19, 2017.

(51) Int. Cl.
*H04L 12/725* (2013.01)
*H04Q 11/04* (2006.01)
(Continued)

(52) U.S. Cl.
CPC ......... *H04L 45/306* (2013.01); *H04B 7/1853* (2013.01); *H04B 7/18528* (2013.01); *H04L 12/6402* (2013.01); *H04L 45/04* (2013.01); *H04L 45/22* (2013.01); *H04L 65/104* (2013.01); *H04L 65/1006* (2013.01); *H04L 65/1016* (2013.01); *H04L 65/1073* (2013.01);
(Continued)

(58) Field of Classification Search
CPC ..... H04L 12/64; H04L 12/707; H04L 12/715; H04Q 11/04; H04Q 3/00; H04W 28/08; H04W 36/22
See application file for complete search history.

(56) References Cited

U.S. PATENT DOCUMENTS 8,386,175 B2 * 2/2013 Limbaugh ............ G08G 5/0013
340/961
9,504,079 B2    11/2016 Zhang et al.
(Continued)

FOREIGN PATENT DOCUMENTS

EP        1850605 A1    10/2007
WO    2014153443 A1    9/2014

OTHER PUBLICATIONS

International Search Report for PCT/US2018/014377 dated Jun. 25, 2018.
(Continued)

*Primary Examiner* — Anez C Ebrahim
(74) *Attorney, Agent, or Firm* — Capitol City TechLaw; Jasbir Singh

(57) ABSTRACT

A cellular system and method to provide voice and data services to a user terminal are disclosed. The cellular system includes a cellular base station; a satellite backhaul including a first satellite link and a second satellite link; and a traffic classifier to classify traffic from the cellular base station as voice traffic for transportation via the first satellite link and as data traffic for transportation via the second satellite link.

21 Claims, 15 Drawing Sheets

(51) Int. Cl.
*H04L 12/707* (2013.01)
*H04Q 3/00* (2006.01)
*H04W 28/08* (2009.01)
*H04L 12/64* (2006.01)
*H04W 36/22* (2009.01)
*H04L 12/715* (2013.01)
*H04L 29/06* (2006.01)
*H04B 7/185* (2006.01)
*H04W 8/04* (2009.01)
*H04W 8/20* (2009.01)
*H04W 36/00* (2009.01)
*H04W 60/04* (2009.01)
*H04W 84/04* (2009.01)
*H04W 84/06* (2009.01)
*H04W 88/08* (2009.01)

(52) U.S. Cl.
CPC ....... *H04Q 3/0029* (2013.01); *H04Q 11/0478* (2013.01); *H04W 28/08* (2013.01); *H04W 36/22* (2013.01); *H04W 8/04* (2013.01); *H04W 8/20* (2013.01); *H04W 36/0055* (2013.01); *H04W 60/04* (2013.01); *H04W 84/045* (2013.01); *H04W 84/06* (2013.01); *H04W 88/08* (2013.01)

(56) References Cited

U.S. PATENT DOCUMENTS

| | | | | |
|---|---|---|---|---|
| 2001/0000137 | A1* | 4/2001 | Ravishankar | H04B 14/046 370/527 |
| 2002/0132619 | A1* | 9/2002 | Wiedeman | H04B 7/1858 455/427 |
| 2007/0123252 | A1* | 5/2007 | Tronc | H04B 7/18563 455/427 |
| 2009/0097462 | A1* | 4/2009 | Ganley | H04B 7/18584 370/338 |
| 2009/0129310 | A1* | 5/2009 | Bruemmer | H04B 7/18513 370/316 |
| 2011/0141947 | A1* | 6/2011 | Li | H04M 3/2281 370/259 |
| 2011/0280178 | A1* | 11/2011 | Heifner | H04B 7/185 370/325 |
| 2013/0077562 | A1* | 3/2013 | Boltz | H04B 7/18534 370/316 |
| 2014/0016531 | A1 | 1/2014 | Yun et al. | |
| 2014/0071818 | A1* | 3/2014 | Wang | H04W 4/029 370/230 |
| 2014/0269613 | A1* | 9/2014 | Tiwari | H04W 36/0022 370/331 |
| 2015/0063346 | A1 | 3/2015 | Eswara et al. | |
| 2015/0124616 | A1 | 5/2015 | Lohman et al. | |
| 2015/0223133 | A1* | 8/2015 | Stojanovski | H04W 52/0251 370/230 |
| 2015/0237587 | A1* | 8/2015 | Livergood | H04W 52/243 370/318 |
| 2015/0382240 | A1 | 12/2015 | Hecht et al. | |
| 2016/0006500 | A1* | 1/2016 | Radpour | H04B 7/18539 370/319 |
| 2016/0028472 | A1* | 1/2016 | Valencia | H04B 7/18513 370/316 |
| 2016/0192235 | A1 | 6/2016 | Ahluwalia et al. | |
| 2017/0171566 | A1* | 6/2017 | Liu | H04N 21/2187 |
| 2017/0229013 | A1* | 8/2017 | Bernhardt | G08G 1/0967 |
| 2017/0230877 | A1* | 8/2017 | Claassen | H04W 36/0016 |
| 2018/0013486 | A1* | 1/2018 | Irani | H04B 7/18521 |
| 2018/0110064 | A1* | 4/2018 | Stojanovski | H04W 72/1278 |

OTHER PUBLICATIONS

International Search Report for PCT/US2018/014386 dated Jun. 25, 2018.
Non-Final office action in U.S. Appl. No. 15/489,990, notification dated Jan. 18, 2019.
Notice of allowance dated Aug. 22, 2019, in U.S. Appl. No. 15/489,990.

* cited by examiner

SYSTEM AND METHOD TO SEPARATELY ROUTE CELLULAR VOICE AND DATA TRAFFIC TO DIFFERENT LOCATIONS WITH A SATELLITE BACKHAUL

FIELD

The present teachings disclose a satellite backhaul that provides the flexibility to carry the LTE traffic from a user terminal (UT) to different geographic locations or countries based on the traffic type. For example, Voice traffic is routed locally within the country to avoid long distance or international billing charge and data traffic is routed to a foreign country that already has the Internet infrastructure.

BACKGROUND

In the prior art, a satellite backhaul network routes all traffic types to one specific destination. In the prior art, the traffic destination is not separated by traffic types such as voice or data.

LIST OF ABBREVIATIONS

| | |
|---|---|
| APN | Access Point Name |
| CN | Core Network |
| CDR | Call Data Record |
| DSCP | Differentiated Services Code Point |
| eNB | Evolved Node B |
| EPC | Evolved Packet Core |
| GW | Gateway |
| HSS | Home Subscriber Server |
| IMS | IP Multimedia Sub-system |
| IP | Internet Protocol |
| LTE | Long Term Evolution |
| MGW | Media gateway |
| MME | Mobility Management Entity |
| NFV | Network Functions Virtualization |
| PCRF | Policy and Charging Rules Function |
| PDN | Packet Data Network |
| PGW | PDN Gateway |
| PSTN | Public Switch Telephone Network |
| SGW | Serving Gateway |
| SIP | Session Initiation Protocol |
| TRX | Transceiver (transmitter/receiver) |
| UT | User Terminal |
| VSAT | Very Small Aperture Terminal |
| VoLTE | Voice over LTE |

FIG. 1 illustrates a prior art cellular system.

A typical LTE cellular system 100 is shown in FIG. 1. The Evolved Packet Core (EPC) Core Network (CN) includes an MME (or MMEs), a Serving Gateway (SGW) and a PDN (Packet Data Network) Gateway (PGW). An Enhanced Node B (eNB) communicates with an MME for signaling and a Serving Gateway (SGW) for user traffic. All User Terminal (UT) traffic goes through the SGW/PGW to its destination. The traffic from the UT (user traffic) may include voice traffic and data traffic. The PGW forwards voice traffic to a Media Gateway (MGW), in the IP Multimedia Subsystem (IMS), that provides communications with a Public Switched Telephone Network (PSTN). The PGW forwards the data traffic to an external network, such as, the Internet.

3GPP standardizes the all-IP network called Long Term Evolution (LTE) cellular network. LTE provides faster rate than its predecessor such as 3G cellular network. In LTE, all user traffic, namely voice and data, is carried as IP traffic. The LTE core network is called Evolved Packet Core (EPC).

EPC includes myriad functions, such as, a serving gateway (SGW) to connect to the access network, i.e., eNB; a packet gateway (PGW or sometimes PDN-GW) to interconnect to the external IP networks such as the Internet and an IP multimedia subsystem (IMS); a mobility management entity (MME) to deal with the control plane and signaling; and the home subscriber server (HSS) to facilitate subscriber-related information. The connection between PGW and external IP network is provided by the SGi interface.

Cellular backhaul over a satellite backhaul provides connectivity of eNBs in underserved areas (rural locations, islands, etc.) to telephone and internet networks deployed in centrally developed locations (urban locations, cities, etc.). Due to the delay incurred over the satellite backhaul and limited radio resources, the user experience for voice and data traffic over the satellite backhaul as compared to low latency and high bandwidth terrestrial links is inferior.

FIG. 2 illustrates a prior art cellular system using a satellite backhaul as backhaul carrier.

A prior art cellular system 200 may include a satellite backhaul 210 as a backhaul carrier. In system 200, the traffic between the eNB and the EPC is carried as backhaul traffic using the satellite backhaul 210 including a Very Small Aperture Terminal (VSAT), a satellite, and a VSAT Gateway (VSAT GW). The eNB is connected to the VSAT and the EPC is connected to a VSAT GW to provide connectivity. In the network configuration of FIG. 1 and FIG. 2, the PGW filters all UT traffic and sends it to a specific destination, for example, voice and its associated signaling is sent to an MGCF/MGW and data and its associated signaling is sent to the Internet.

The present teachings disclose integration of cellular and satellite backhaul components at a cell site to enhance the user experience with respect to call setup times and latency. The present teachings also disclose flexibility to efficiently route voice and data traffic to different locations or geographic regions (e.g., different countries) to minimize costs to operators as well as end users.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A cellular system to provide voice and data services to a user terminal is disclosed. The cellular system includes a cellular base station; a satellite backhaul including a first satellite link and a second satellite link; and a traffic classifier to classify traffic from the cellular base station as voice traffic for transportation via the first satellite link and as data traffic for transportation via the second satellite link.

A method for providing voice and data services to a user terminal of a cellular system is disclosed. The method includes: providing a cellular base station; providing a satellite backhaul including a first satellite link and a second satellite link; classifying traffic from the cellular base station as voice traffic or data traffic; and transporting the voice traffic via the first satellite link and the data traffic via the second satellite link.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

The present teachings disclose a satellite backhaul that provides the flexibility to carry the LTE traffic from a user terminal (UT) to different geographic locations or countries based on the traffic type. For example, voice traffic is routed locally within the country to avoid long distance or international billing charge and data traffic is routed to a foreign country that already has the Internet infrastructure.

Figure 1:
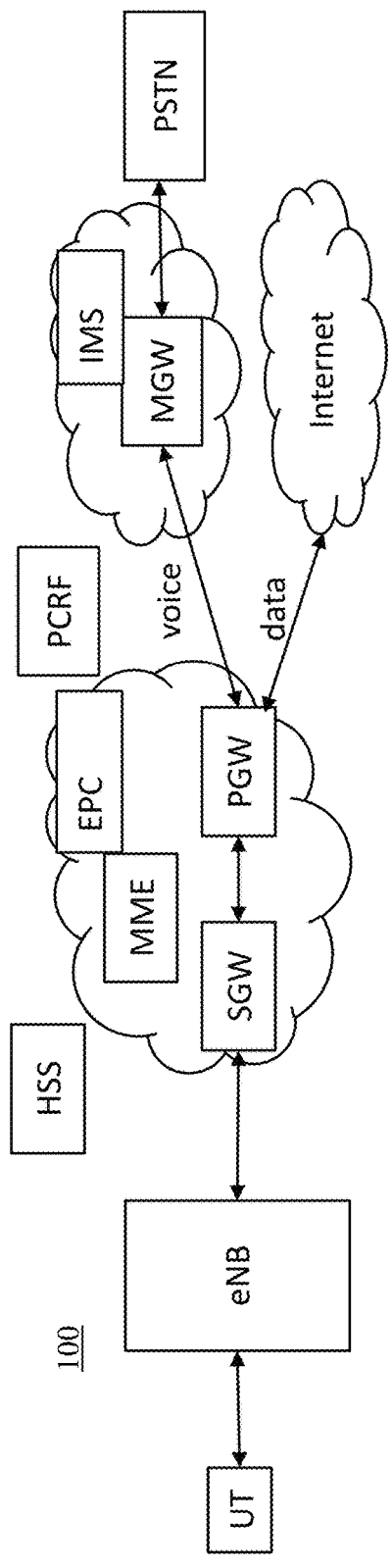
FIG. 1 illustrates a prior art cellular system.
Figure 2:
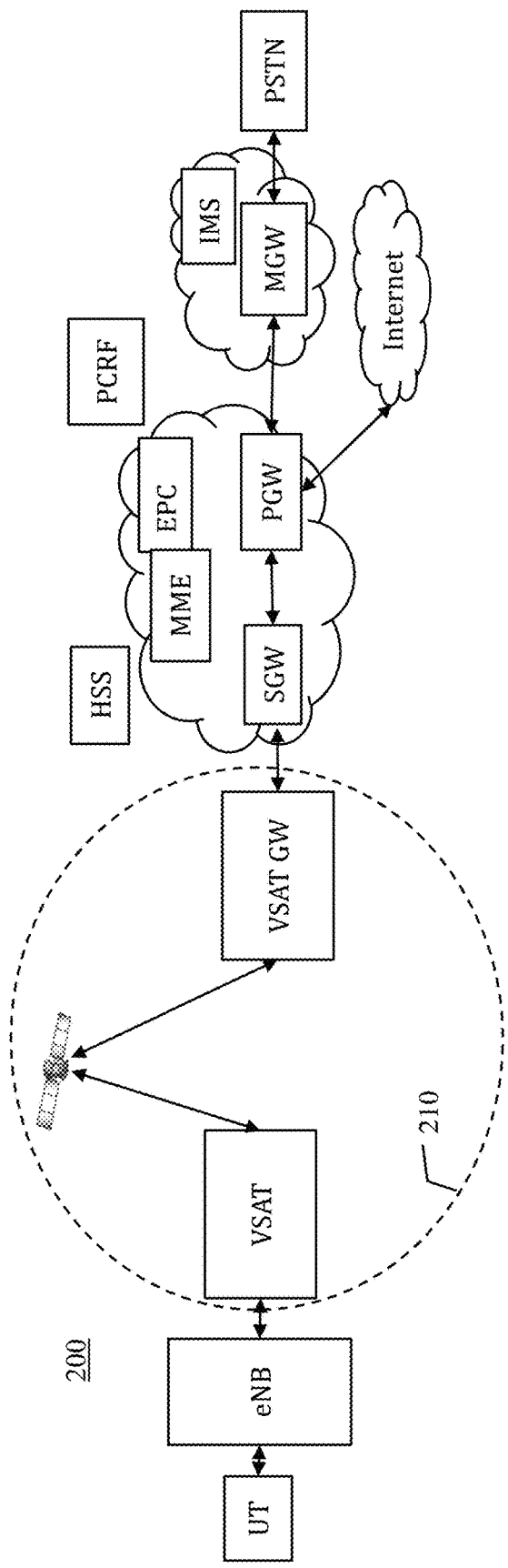
FIG. 2 illustrates a prior art cellular system using a satellite backhaul as a backhaul carrier.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Introduction

The present teachings disclose a satellite backhaul that provides the flexibility to carry user traffic from a user terminal (UT) over a cellular system, such as, a Long-Term Evolution (LTE) network, to different geographic regions based on the traffic type. For example, voice traffic may be routed locally within a first region to avoid a long distance or international billing charge and data traffic may be routed to a second region different than the first region. The second region may have a more robust Internet infrastructure or maybe closer to data centers providing services over the internet. In exemplary embodiments, a region may be a country, a state or province, a legal jurisdiction or the like.

The present teachings allow cellular traffic, for example, from an LTE Evolved Node B (eNB) site, to be routed to different regions with the voice going to one region and data going to another. In exemplary embodiments, a cell-site may be located in a geographic region having only a basic telephone network infrastructure with limited or no internet network connectivity. In such a case, voice traffic from the cell site can be routed to a local, for example, in-country, telephone network while data traffic can be routed to a location, for example, out-of-country, that has a mature internet infrastructure.

The present teachings disclose integration of cellular and satellite backhaul components at a cell site to enhance the user experience with respect to call setup times and latency. The present teachings also disclose local switching of voice calls, for example, at an LTE cell site. The present teachings also disclose flexibility to efficiently route voice and data traffic to different locations or geographic regions (e.g., different countries) to minimize costs to operators as well as end users.

In various embodiments, the present teachings disclose multiple integration options including, without limitation:

VSAT with EPC components (MME, SGW, PGW) and PCRF;

VSAT with eNB, EPC components (MME, SGW, PGW) and PCRF; and

Dual transceivers at the VSAT for applications that require VSAT to communicate with two gateways (e.g. separation of voice and data traffic)

In certain conditions, it is very difficult to connect a cellular network base station or Enhanced Node B (eNB), for example, an LTE eNB, to its Core Network (CN). The difficult conditions may include a distance to the core network, right-of-way to the core network, the terrestrial landscape or the like. For difficult conditions, a satellite backhaul is a viable solution to carry traffic between eNB and the CN.

Satellite communication network for LTE backhaul includes a VSAT and a VSAT Gateway (GW) where the eNB is connected to the VSAT and the CN is connected to the VSAT GW.

The present teachings disclose multiple network designs where the traffic from an eNB is routed to two different geographic regions, locations or countries based on the traffic type. Similarly, traffic from two different geographic locations or countries is routed to an eNB based on the traffic type.

The procedures and messages described here are based on well-known and widely deployed 3GPP standard. As such, the present teachings reference the standards and do not disclose special signaling such as signaling for Specific IP Traffic Offload (SIPTO) or signaling for Local IP access (LIPA).

System Description

Figure 3:
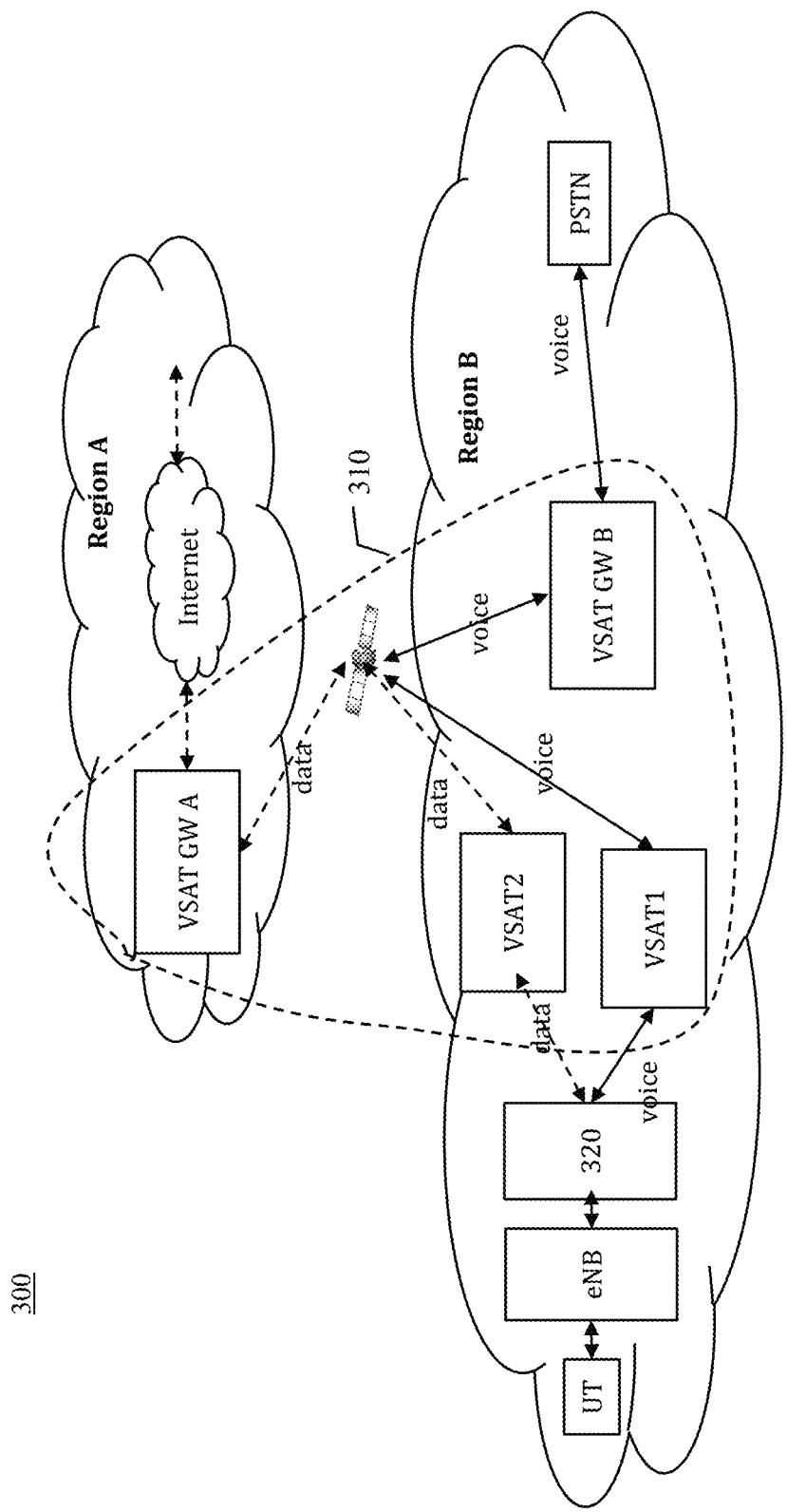
FIG. 3 illustrates a cellular system including a satellite backhaul that separately routes for voice traffic and data traffic over a satellite link according to various embodiments.

FIG. 3 illustrates a cellular system including a satellite backhaul that separately routes for voice traffic and data traffic over a satellite link according to various embodiments.

A cellular system 300 may include a satellite backhaul 310 to provide communication service to an eNB and any UTs being serviced by the eNB. The satellite backhaul 310 may include a VSAT 1 for communicating voice traffic with a VSAT GW B, and a VSAT 2 for communicating data traffic with a VSAT GW A. In exemplary embodiments, a UT may be serviced by an Enhanced Node B (eNB) in region B. The UT may generate UT traffic that may be split by classification. The voice traffic included in the UT traffic may be sent to a PSTN of region B. By routing voice traffic within region B, long distance or international voice call charges may be minimized for an end user of the UT. In contrast, data traffic included in the UT traffic may be sent to region A that is a different geographic region from region B. Routing of data traffic to region A may enhance an experience for the end user of the UT by decreasing latency or the like. The enhanced user experience for data services may be because region A has a better Internet infrastructure than region B.

In exemplary embodiments, region A may be a first country and region B may be a second country different from the first country. In exemplary embodiments, region B may be a rural location in a country while region A may be in the same country, but with a better Internet infrastructure than region B.

In exemplary embodiments, classification or splitting of the traffic may be provided by a traffic classifier 320, such as a PGW. As a traffic classifier 320, the PGW may classify the traffic with a traffic type, such as a Differentiated Services Code Point (DSCP), or any other traffic characteristics to separate voice and data traffic. Traffic may be classified by other traffic characteristics, such as source address, destination address or traffic type and assigned to a specific traffic class. In EPC, the PGW provides connectivity from the UT to external packet data networks by being the point of exit and entry of traffic for the UT. The traffic classification may be used to route voice and data traffic separately, for example, by a router (not shown). In some embodiments, network traffic through the router may be subjected to classification and conditioning.

The satellite backhaul 310 may include a VSAT, a VSAT GW and satellite links. In FIG. 3, a satellite link for transporting data traffic is illustrated with a dashed line, and a satellite link for transporting voice traffic is illustrated with a solid line. In some embodiments, VSAT GW A, VSAT GW B, or both may be a VSAT. In some embodiments, VSAT 1, VSAT 2, or both may be a VSAT GW. In exemplary embodiments, VSAT 1 and VSAT 2 may utilize the same radio, the same antenna, the same demodulator, or the like, to send and receive at least two information streams with one stream for VSAT GW A and one stream for VSAT GW B.

Figure 4:
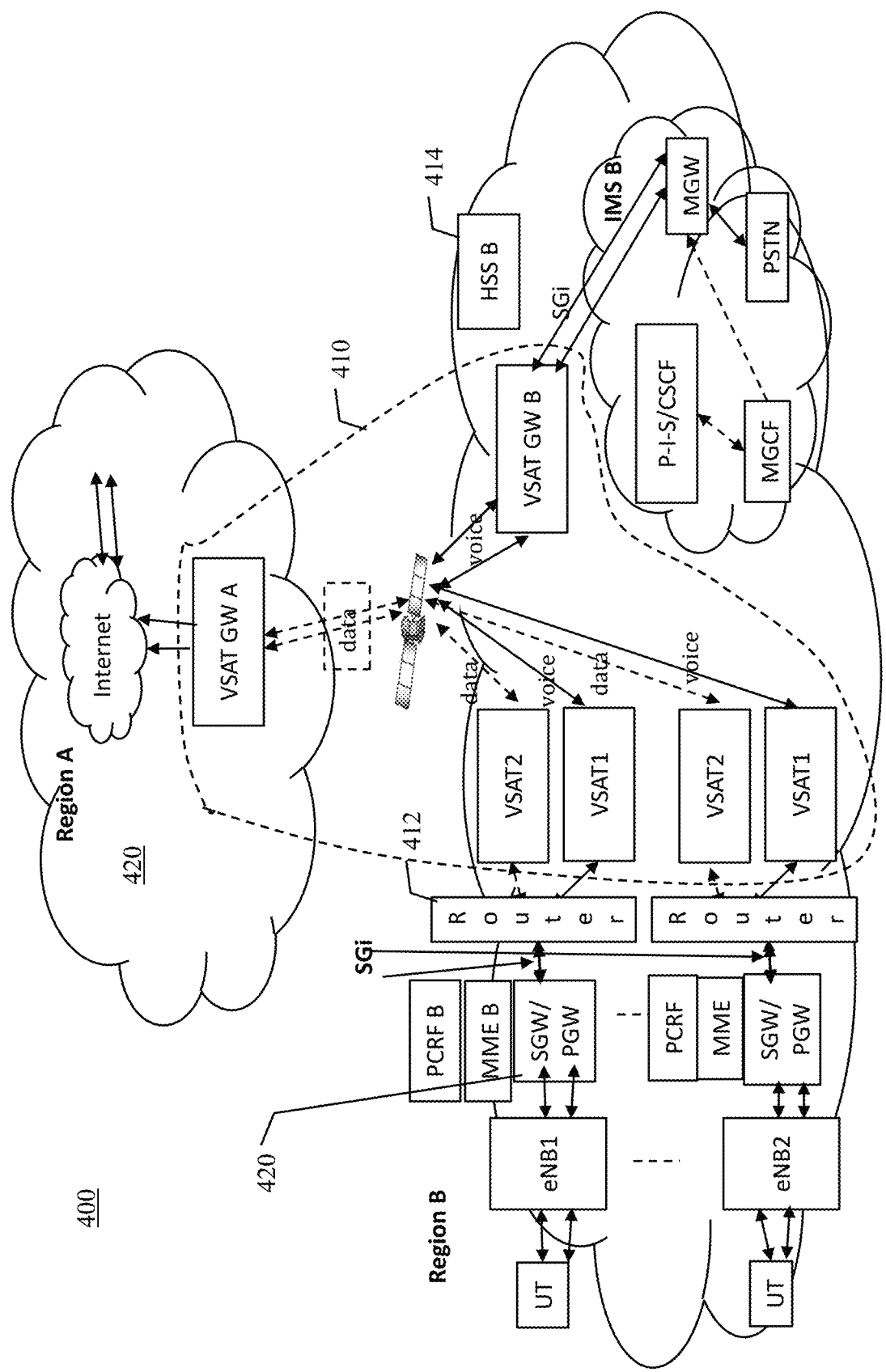
FIG. 4 illustrates a cellular system including a satellite backhaul and a PDN (Packet Data Network) Gateway (PGW) co-located with Evolved Packet Core (EPC) components according to various embodiments.
Figure 9:
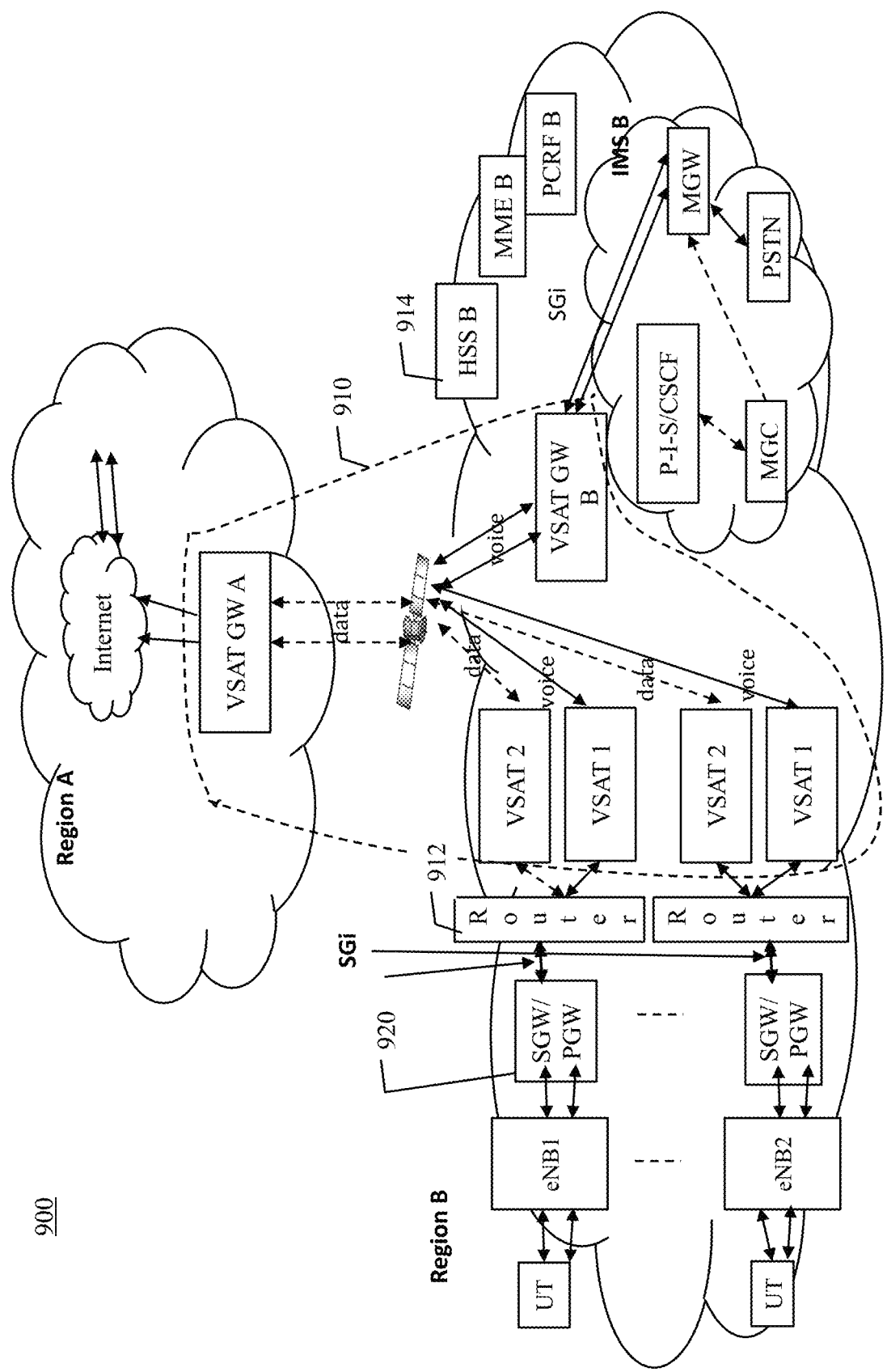
FIG. 9 illustrates a cellular system including a satellite backhaul and a PGW with EPC components split across the satellite backhaul according to various embodiments.

In some embodiments, the cellular system of the present teachings may utilize a PGW disposed between the eNB, and VSAT 1 and VSAT 2 (see, for example, FIG. 4 or FIG. 9). For brevity, this configuration is referred to as a "single PGW configuration" in the present teachings; nothing in the present teachings limits the number of PGWs in this configuration to only one or a single PGW. In some embodiments, the cellular system of the present teachings may not utilize a PGW disposed between the eNB, and VSAT 1 and VSAT 2 (see, for example, FIG. 14). For brevity, this configuration is referred to as a "multiple PGW configuration" in the present teachings.

Single PGW Configuration

In a single PGW configuration, the PGW a UT is located locally in a region, i.e., region B. A traffic classifier, for example, included in the PGW, differentiates between voice and data traffic from the UT and includes a traffic type in the UT traffic to the router. A router uses the traffic type to route, for example, the data traffic to another region, for example, region A.

Billing for the UT is reported by the PGW to a central billing system of region B. In a Call Data Record (CDR) an itemized billing for the UT indicates billing information, for example, the traffic type such as voice or data, the source and destination IP addresses, and other specific characteristics relevant to the billing system to properly charge the voice and data usage. In exemplary embodiments, the router may route based on an IP destination address.

For the single PGW configuration, there are two options on how to dispose of the EPC components: co-located and split EPC components.

Co-Located EPC Components for Single PGW Configuration

FIG. 4 illustrates a cellular system including a satellite backhaul and a PDN (Packet Data Network) Gateway (PGW) co-located with Evolved Packet Core (EPC) components according to various embodiments.

A cellular system 400 may include a satellite backhaul 410 to provide communication service to an eNB and any UTs being serviced by the eNB. The satellite backhaul 410 may include a VSAT 1 for communicating voice traffic with a VSAT GW B, and a VSAT 2 for communicating data traffic with a VSAT GW A. In the cellular system 400 the voice and data are split with a single PGW configuration. For this configuration, the eNB, MME, SGW, PGW 420, and PCRF are located in region B. In exemplary embodiments, the eNB, MME, SGW, PGW 420, and PCRF are located close to one another. In exemplary embodiments, the associated HSS B 414 and IMS are centralized inside region B, although not necessarily close to the eNB. In the exemplary embodiment of FIG. 4, region B has two eNBs (eNB1 and eNB2), each associated with an EPC CN (MME, SGW, PGW) and a PCRF. However, the HSS B 414 and IMS are common for all UTs in Region B. The satellite backhaul 410 may include satellite links. In FIG. 4, a satellite link for transporting data traffic is illustrated with a dashed line, and a satellite link for transporting voice traffic is illustrated with a solid line.

The PGW 420 associated with eNB1 is connected to two VSATs (VSAT 1 and VSAT 2) through a router 412. The PGW associated with eNB2 is connected to two VSATs through a router. In exemplary embodiments, the SGW interfaces to the PGW 420 via an S5 interface. A traffic classifier included in the PGW differentiates between voice and data traffic from the UT and includes a traffic type in the UT traffic to the router 412.

The router 412 inspects and routes the traffic to the appropriate VSAT depending on the traffic type. As illustrated in FIG. 4, voice traffic is routed to the VSAT 1 communicating with VSAT GW B. Generally, VSAT 1 and VSAT GW B are disposed in the same region, i.e., region B. Data traffic is routed to the VSAT 2 communicating with VSAT GW A. Generally, VSAT 2 and VSAT GW A are disposed in the different regions, i.e., region B and region A respectively. In exemplary embodiments, the router determines the traffic type based on a destination IP address, a DSCP, or any other characteristic to distinguish voice from data traffic. In exemplary embodiments, information transfer between the SGW/PGWs disposed in region B may be communicated via terrestrial communications. In exemplary embodiments, information and signaling necessary to provide voice services to the UT may be typed as "voice traffic." For example, the IMS and HSS information and signaling may be classified as voice traffic and thus be routed to VSAT GW B by the router. In exemplary embodiments, information and signaling necessary to provide data services, such as the Internet, to the UT may be typed as "data traffic."

Figure 5:
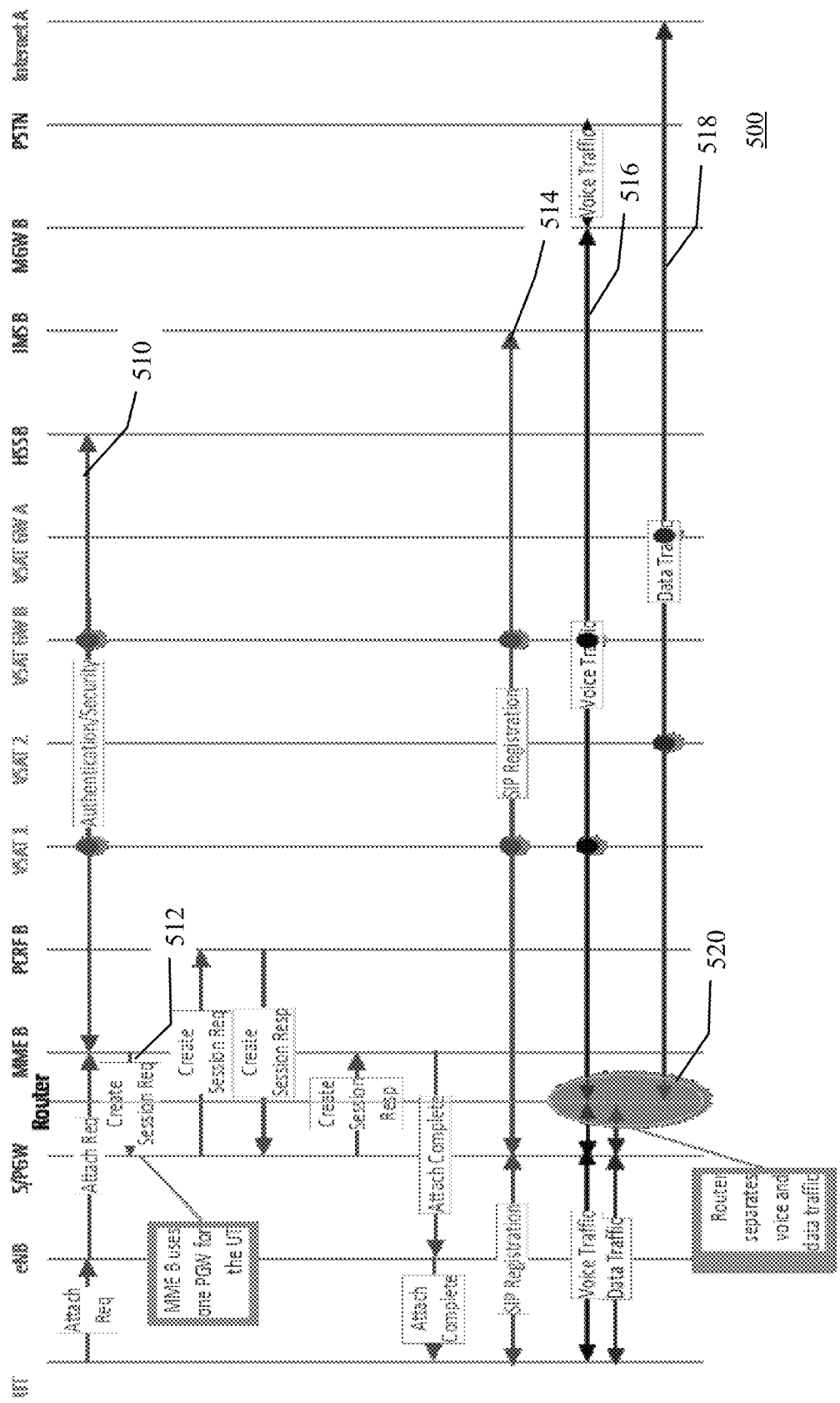
FIG. 5 illustrates a registration flow for a User Terminal (UT) for a cellular system of FIG. 4 according to various embodiments.

FIG. 5 illustrates a registration flow for a User Terminal (UT) for a cellular system of FIG. 4 according to various embodiments.

An advantage of the cellular system 400 of FIG. 4 is reduced latency as the UT signaling need not go over the satellite backhaul 410. Exemplary UT signaling may include attach or release, dedicated bearer setup, and other signaling. In exemplary embodiments, a centralized component of the cellular system 400 of FIG. 4 is the HSS B storing the profiles for all UTs in region B.

A flow 500 of servicing a UT includes the following operations. Every UT in region B attaches at operation 510 to the EPC also in region B. During the attach operation 502, an MME B consults the HSS B (FIG. 4, 414) to get the UT subscription profile. The default and dedicated bearers for the UT are defined in a co-located PCRF B that pushes the information to the PGW (FIG. 4, 420). Every UT in region B has its traffic (voice and data) go through a single SGW and PGW pairing. In other words, every UT is only assigned a single Access Point Name (APN) managed by the single PGW.

After the UT attaches to the EPC network, the UT registers at operation 514 to the IMS in region B. In exemplary embodiments, the registration at operation 514 may be a Session Initiation Protocol (SIP) Registration. After registering, the UT can start Voice over LTE (VoLTE) session or receive VoLTE incoming call. For a UT to UT voice call, the voice traffic between UTs is routed locally by the PGW and the voice traffic for a call between a UT serviced by the eNB1 to a UT serviced by the eNB2 does not go over the satellite backhaul (FIG. 4, 410). Hence, the latency for such a UT to UT voice call is low.

In this example, the traffic classifier in the PGW (FIG. 4, 420) splits the UT traffic, and the router (FIG. 4, 412) inspects the traffic and separately routes, at operation 520) the data traffic to VSAT 2 at operation 518 and voice traffic to VSAT 1 at operation 516. Signaling between the MME and the HSS, and between the UTs and the IMS are routed to VSAT 1 since the HSS and the IMS are located inside region B.

Paging for Single PGW Configuration

Figure 6:
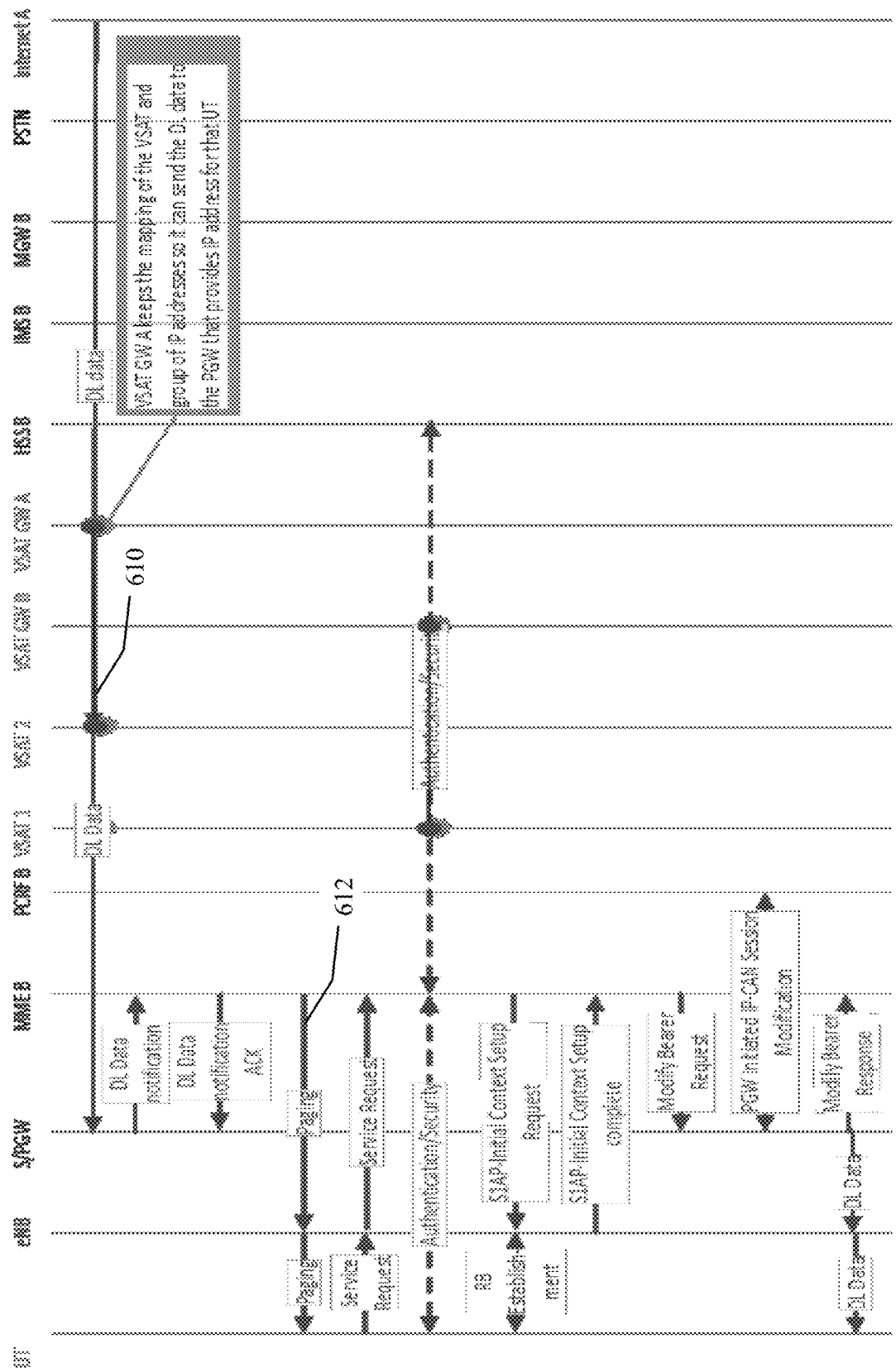
FIG. 6 illustrates a flow for paging a UT for incoming data for a cellular system of FIG. 4 according to various embodiments.

FIG. 6 illustrates a flow for paging a UT for incoming data of FIG. 4 for a cellular system according to various embodiments.

A flow 600 of servicing a UT includes the following operations. For incoming data traffic, as the data for a UT is coming from VSAT GW A (FIG. 4, VSAT GW A is in region A), VSAT GW A communicates with the VSAT (VSAT 2) that can route the incoming data to the UT. In some embodiments, the VSAT GW A maps a pool of IP addresses to a particular PGW and directs the particular PGW to assign an IP address to a UT from the pool of IP addresses at operation 610. Thus, the VSAT GW A maps a destination UT IP address to communicate the incoming data to the associated PGW. In cellular systems, paging at operation 612 is sent by the MME if there is incoming traffic destined for a UT in Idle Mode.

Figure 7:
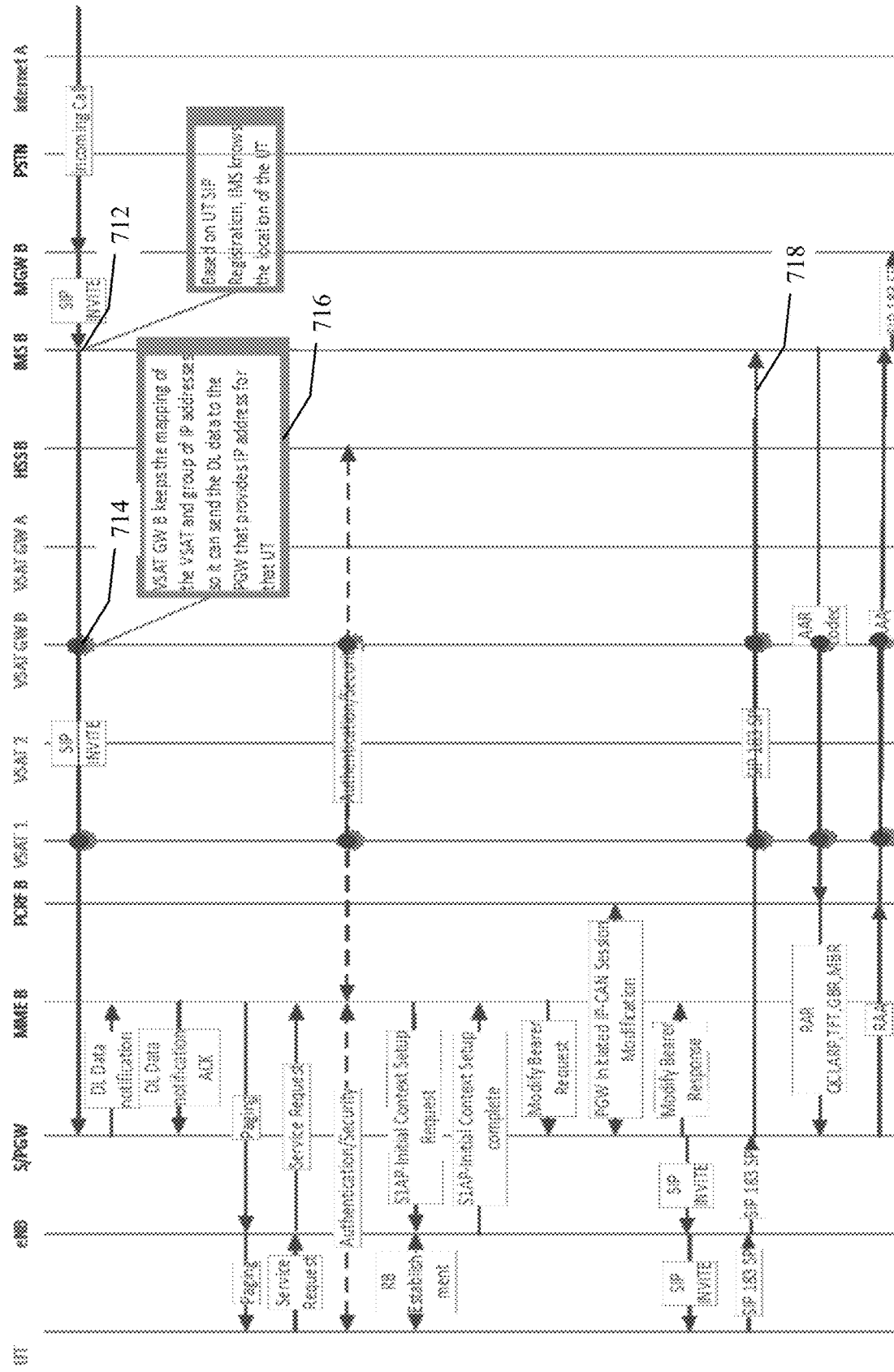
FIG. 7 illustrates a flow for paging a UT for incoming voice call for a cellular system of FIG. 4 according to various embodiments.

FIG. 7 illustrates a flow for paging a UT for incoming voice call for a cellular system of FIG. 4 according to various embodiments.

A flow 700 of servicing a UT includes the following operations. For an incoming voice call, the IMS knows the location of the UT from the HSS at operation 712. IMS forwards the SIP INVITE to the VSAT GW B which in turns sends the SIP INVITE to the PGW at operation 714. The VSAT GW B determines the location of the UT at operation 716. In some embodiments, the VSAT GW B maps a pool of IP addresses to a particular PGW and the VSAT configured to communicate with the PGW. In some embodiments, the UT IP address is assigned by the PGW. Thus, the destination UT IP address may be used by the VSAT GW B to determine which VSAT should receive the incoming voice data to process the SIP Invite request. At operation 718, a response to the SIP Invite may be provided by the UT.

When the PGW (FIG. 4, 420) receives downlink (DL) data for a UT, either for data traffic or for voice SIP signaling, PGW will look at the state of the UT. If PGW does not have any information about that UT, PGW sends a notification to MME indicating that there is DL data for that UT. MME then starts the Paging process of FIG. 5.

As seen from FIG. 5 and FIG. 6, since the MME is located in the VSAT site, there are only a few paging steps that need to go over the satellite backhaul (FIG. 4, 410). For Paging for Voice signaling as shown in FIG. 7, there are few more signaling steps that go over the satellite backhaul for a voice call as another dedicated bearer needs to be created for carrying the voice media traffic.

Handover for Single PGW Configuration

Figure 8:
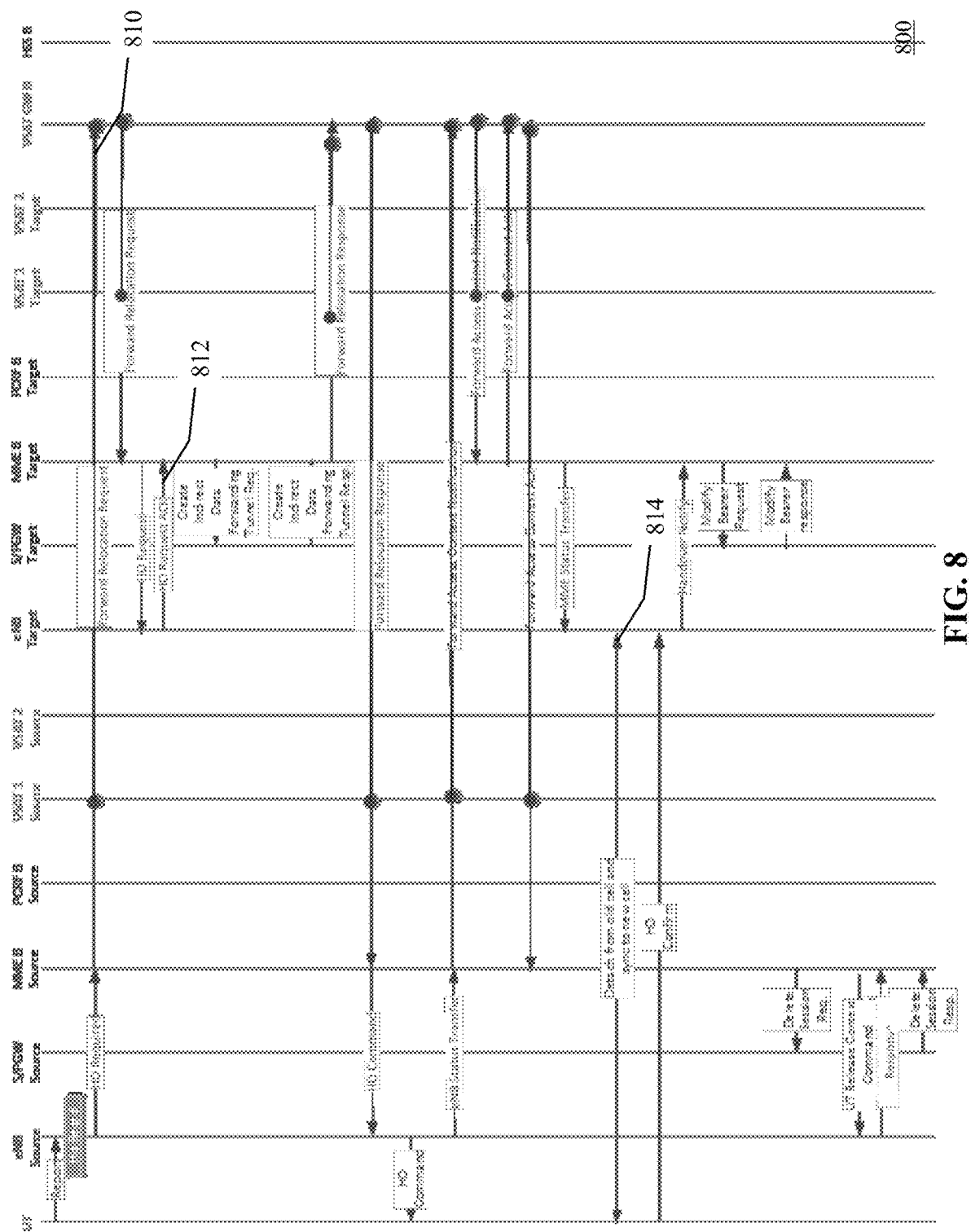
FIG. 8 illustrates a flow for a handover of a UT for a cellular system of FIG. 4 according to various embodiments.

FIG. 8 illustrates a flow for a handover of a UT for a cellular system of FIG. 4 according to various embodiments.

FIG. 8 illustrates the handover (HO) flow 800. FIG. 8 is based on an S1 handover where the signaling messages from target to source or vice versa are carried on the S1 interface. In some embodiments, the transfer of eNB data is carried on X1 interface. X1 interface is an interface between eNBs. The HO procedure illustrated in FIG. 8 is also for a condition where there is no direct terrestrial link between the source and target eNBs. Since all EPC components are located at the eNB site, only a few signaling steps between source and target go through the satellite backhaul. At operation 810 a source eNB transmits an HO request to relocate a UT to a target eNB to a target MME. The relocation request traverses the satellite backhaul. At operation 812, the target MME creates an indirect data forwarding tunnel to the target eNB. At operation 84, the UT is detached from the source eNB to the target eNB. The UT contexts at the source PGW can also be transferred to the target PGW so that UT session will still be active during and after HO.

Split EPC Components

FIG. 9 illustrates a cellular system including a satellite backhaul and a PGW with EPC components split across the satellite backhaul according to various embodiments.

A cellular system 900 may include a satellite backhaul 410 to provide communication service to an eNB and any UTs being serviced by the eNB using a single PGW 920. For the cellular system 900, an SGW and PGW 920 pair are located near the eNB. The MME, PCRF, HSS and the IMS components are centralized inside the region and are common for all UTs in region B. The PGW connects to two VSATs (VSAT1 and VSAT2) through a router 912. The SGW interfaces to the PGW 920 via the S5 interface. The satellite backhaul 910 may include satellite links. In FIG. 9, a satellite link for transporting data traffic is illustrated with a dashed line, and a satellite link for transporting voice traffic is illustrated with a solid line.

The PGW 920 associates a traffic type with the traffic from a UT, the router 912 inspects the traffic type and routes the associated traffic to the appropriate VSAT depending on the traffic type. The voice traffic is routed to the VSAT1 that is communicating with VSAT GW B within a region or country B. Data traffic to the internet is routed to the VSAT2 that is communicating with VSAT GW A in a different country or region A.

The router 912 may inspect the traffic type based on destination IP address, DSCP, and any other distinct characteristic to distinguish voice and data traffic for proper routing. The following description is applicable for a UT in Country B. Network traffic through the router 912 may be subjected to classification and conditioning. Traffic may be classified by many different parameters, such as source address, destination address or traffic type and assigned to a specific traffic class. Traffic in each class may be further conditioned by subjecting the traffic to rate limiters, traffic policers or shapers.

Figure 10:
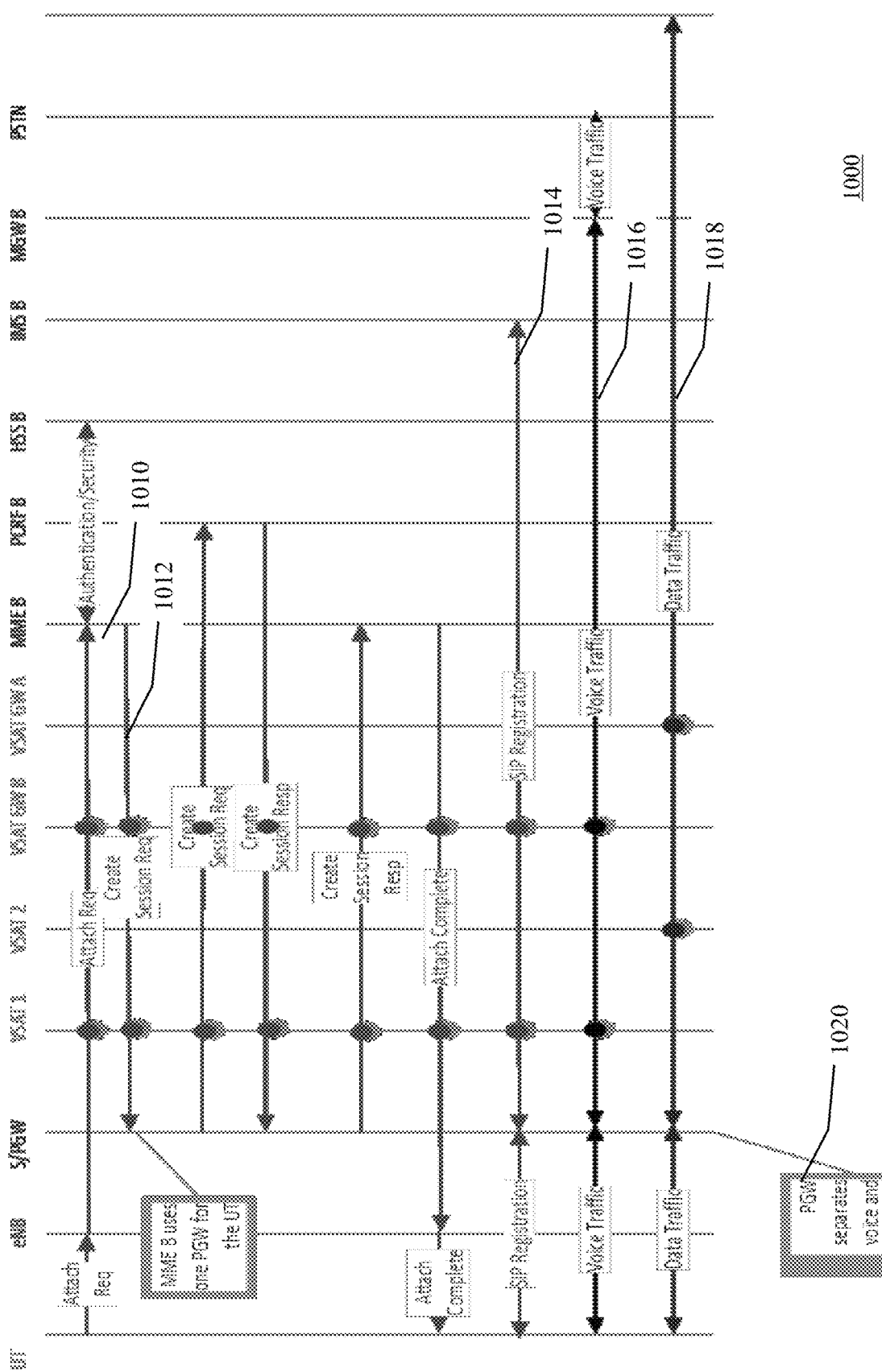
FIG. 10 illustrates a registration flow for a UT for a cellular system of FIG. 9 according to various embodiments.

FIG. 10 illustrates a registration flow for a UT for a cellular system of FIG. 9 according to various embodiments.

A UT in country B attaches to the EPC in country B. During the attach process, per operation 1010, MME B consults the HSS B to get the UT subscription profile. The default and dedicated bearers for the UT are defined in PCRF B and the PCRF B then pushes, per operation 1012, the bearers to PGW 920 of FIG. 9. The UT in country B has its voice and data traffic go through one SGW and one PGW 920. In other words, every UT is only assigned a single APN.

After the UT attaches to the EPC network, the UT may register with the IMS in Country B per operation 1014 using, for example, a SIP registration. After the registration per operation 1012, the UT may start a Voice over LTE (VoLTE) session or receive a VoLTE incoming call per operation 1016.

In exemplary embodiments, the router 912 inspects the traffic per operation 1020 and routes the data traffic to VSAT 2 per operation 1018 and voice traffic to VSAT 1 per operation 1016. Signaling between MME and HSS and between UT and IMS are routed to VSAT 1 since HSS and IMS are located inside the country B.

Paging for Split EPC Components

Figure 11:
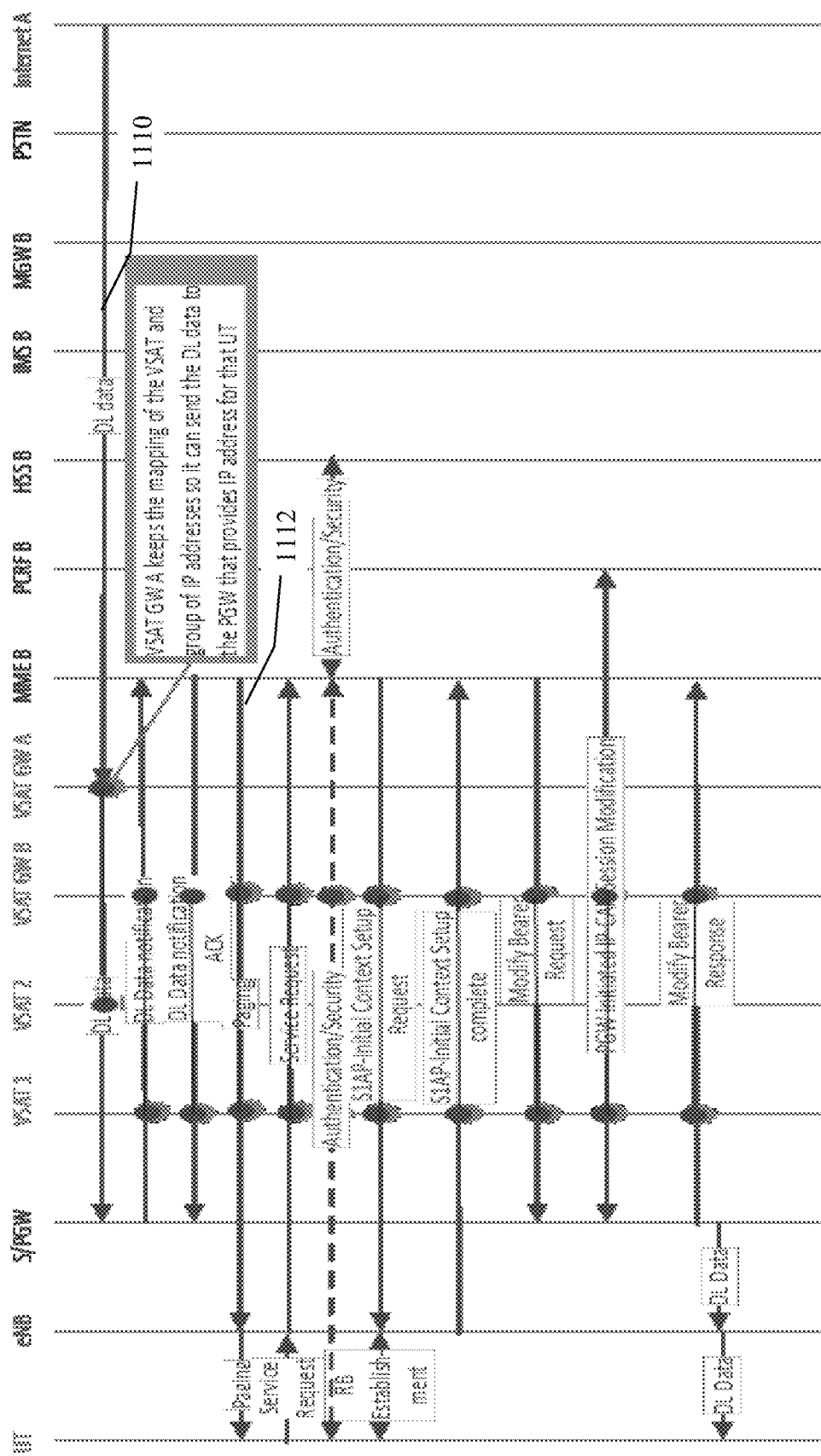
FIG. 11 illustrates a flow for paging a UT for incoming data for a cellular system of FIG. 9 according to various embodiments.

FIG. 11 illustrates a flow for paging a UT for incoming data for a cellular system of FIG. 9 according to various embodiments.

A flow 1100 of servicing a UT includes the following operations. Paging is sent by an MME if there is incoming data traffic destined for a UT in Idle Mode. For incoming data traffic, since the data for a UT is coming from VSAT GW A (VSAT GW A is in country A), VSAT GW A needs to determine the VSAT (VSAT 2) that can route the incoming data to the UT. In some embodiments, the VSAT GW A maps a pool of IP addresses to a particular PGW and directs the PGW to assign an IP address to a UT from the pool of IP addresses assigned to the PGW at operation 1110. Thus, the VSAT GW A maps a destination UT IP address to communicate the incoming data to the associated PGW. In cellular systems, paging at operation 1112 is sent by the MME if there is incoming traffic destined for a UT in Idle Mode.

Figure 12:
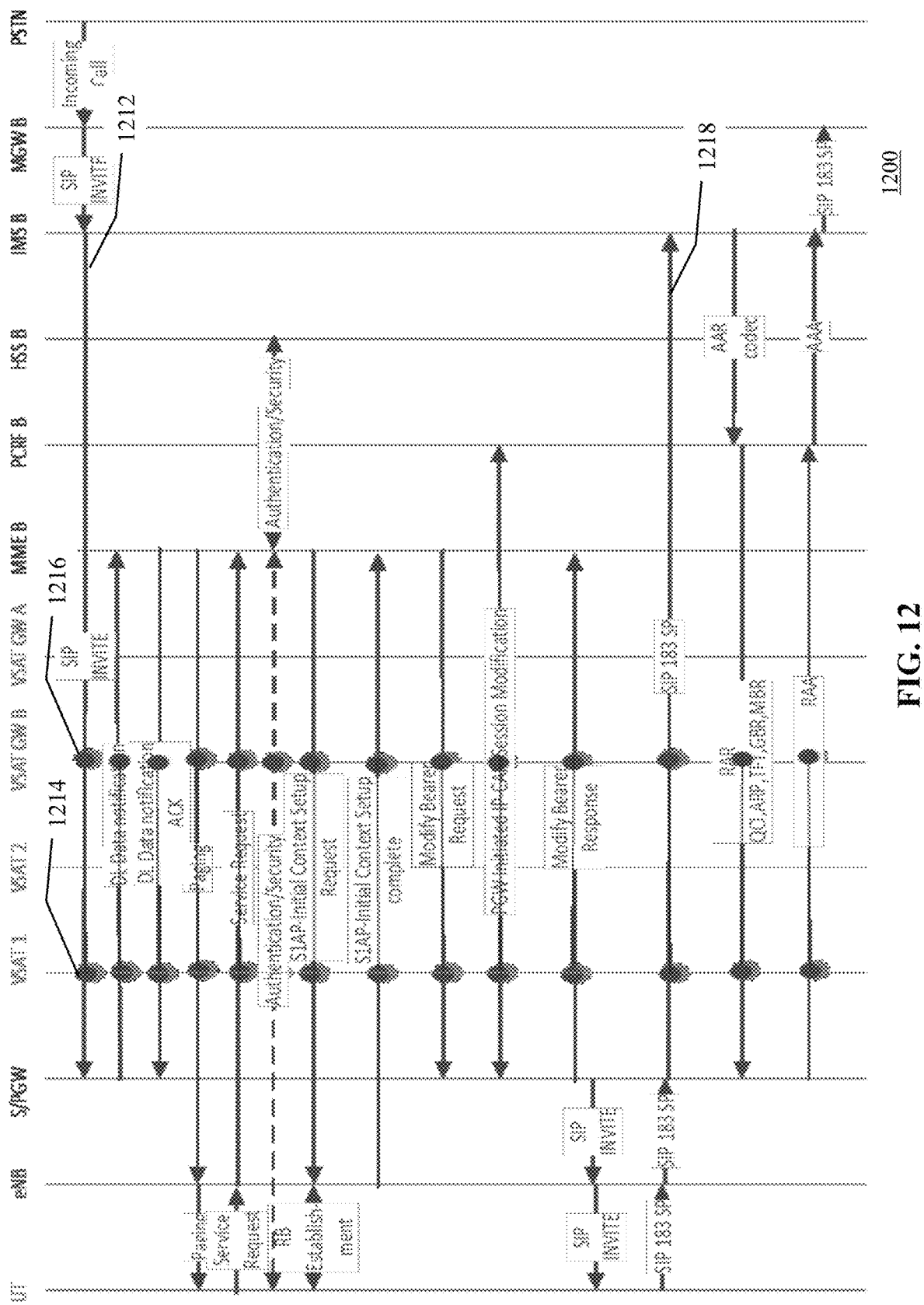
FIG. 12 illustrates a flow for paging a UT for incoming voice call for a cellular system of FIG. 9 according to various embodiments.

FIG. 12 illustrates a flow for paging a UT for incoming voice call for a cellular system of FIG. 9 according to various embodiments.

A flow 1200 of servicing a UT includes the following operations. For an incoming voice call, the IMS knows the location of the UT from the HSS at operation 1212. The IMS forwards the SIP INVITE to the VSAT GW B which in turns sends the SIP INVITE to the PGW at operation 1215. The VSAT GW B determines the location of the UT at operation 1216. In some embodiments, the VSAT GW B maps a pool of IP addresses to a particular PGW and the VSAT configured to communicate with the PGW. In some embodiments, the UT IP address is assigned by the PGW. Thus, the destination UT IP address may be used by the VSAT GW B to determine which VSAT should receive the incoming voice data to process the SIP Invite request. At operation 1218, a response to the SIP Invite may be provided by the UT.

When PGW receives DL data for a UT, either for data traffic or for voice SIP signaling, PGW will look at the state of the UT. If PGW does not have any information about that UT, PGW sends a notification to MME indicating that there is DL data for that UT. MME then starts the Paging process of FIG. 10.

As seen from FIG. 11 and FIG. 12, since the MME is located in the VSAT GW site, there are many Paging steps that need to go over the satellite backhaul. For Paging for voice signaling as shown in FIG. 12, there are few more signaling steps that go over the satellite since, for a voice call, another dedicated bearer needs to be created for carrying the voice media traffic.

Handover for Split EPC Components

Figure 13:
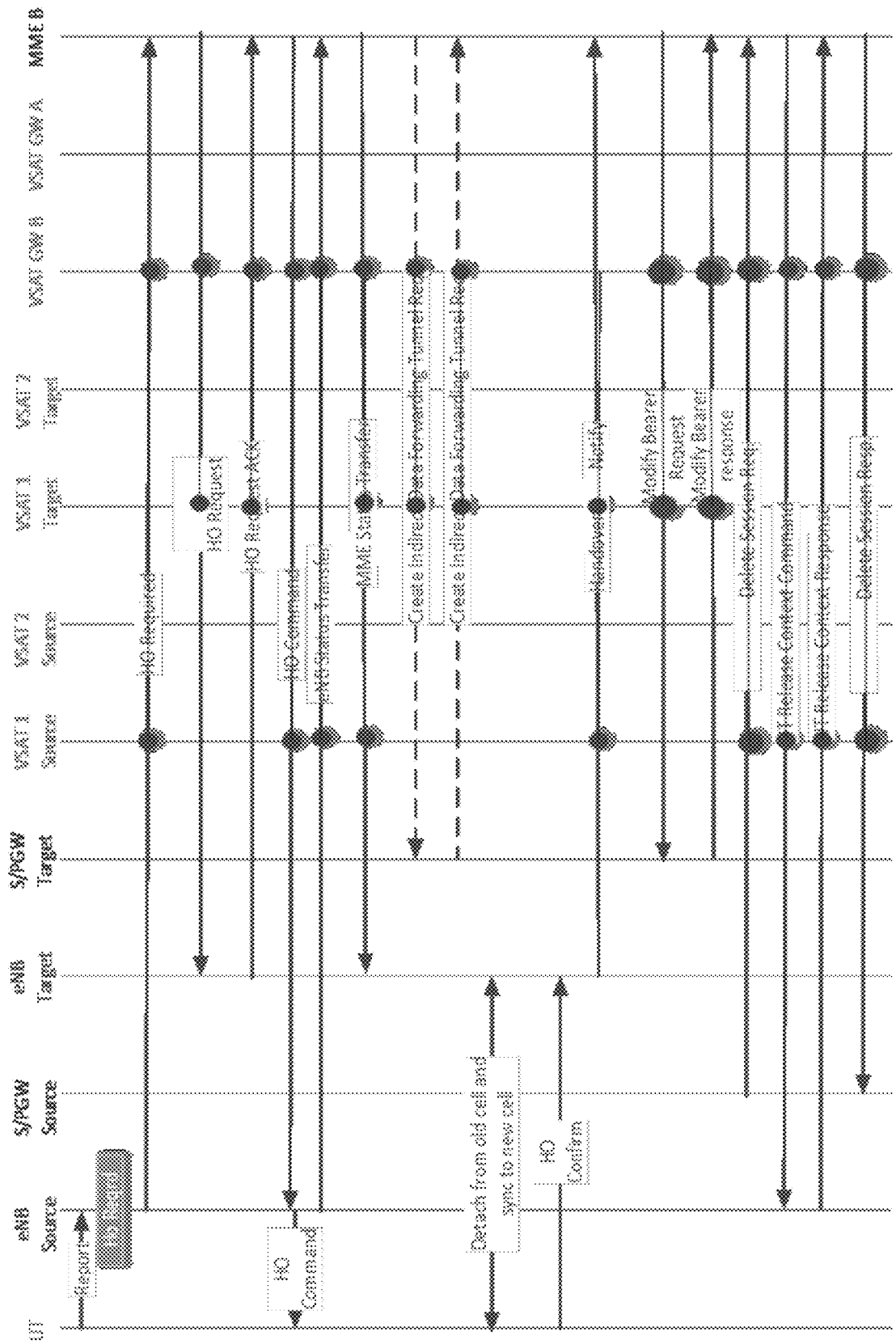
FIG. 13 illustrates a flow for a handover of a UT for a cellular system of FIG. 9 according to various embodiments.

FIG. 13 illustrates a flow for a handover of a UT for a cellular system of FIG. 9 according to various embodiments.

FIG. 13 illustrates the HO flow 1300. FIG. 8 is based on an S1 handover where the signaling messages from target to source or vice versa are carried on the S1 interface. In some embodiments, the transfer of eNB data is carried on X1 interface. X1 interface is an interface between eNBs. The HO procedure of FIG. 13 also depicts a flow for when there is no direct terrestrial link between the source and target eNBs. The UT contexts at the source PGW can also be transferred to the target PGW so that UT session will still be active during and after HO.

Since the MME is reachable over a satellite backhaul by the eNB via the VSAT GW B (MME B), the MME B may handle all UTs in country B. Thus, an HO in the cellular network of FIG. 9 may have an MME change. This simplifies the HO procedure. However, since the SGW and PGW are located at the eNB site, many of the HO signaling steps have to go via the satellite.

Two PGW Networks

Figure 14:
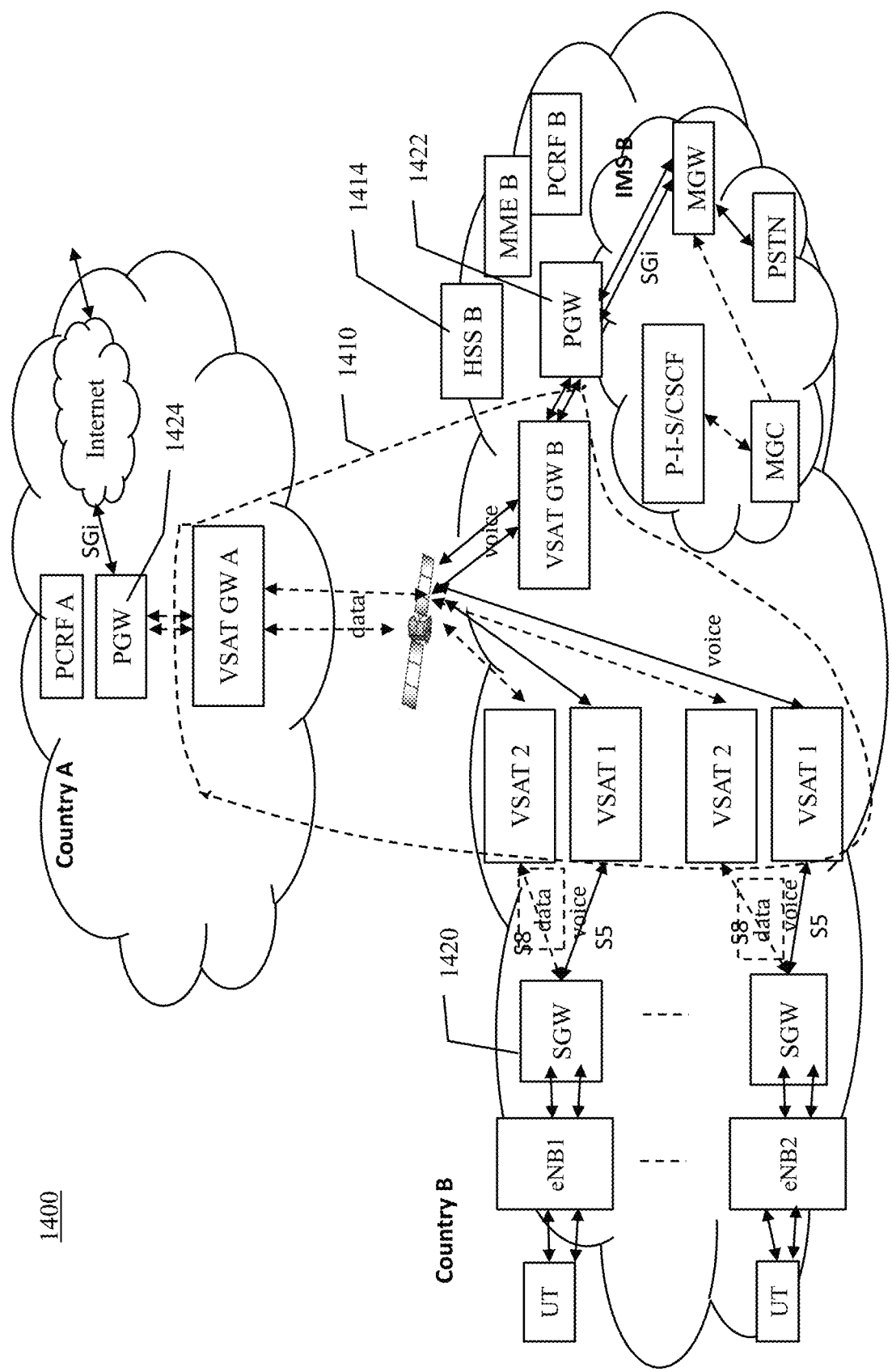
FIG. 14 illustrates a cellular system including a satellite backhaul and multiple PGWs according to various embodiments.

FIG. 14 illustrates a cellular system including a satellite backhaul and multiple PGWs according to various embodiments.

A cellular system 1400 may include a satellite backhaul 1410 (or a Satellite Backhaul Network) with multiple PGWs 1420, 1424. For the cellular system 1400, country A and B may have an EPC CN including an MME, an SGW, and a PGW. Country A and B may also components such as a PCRF, an HSS, and an IMS.

In FIG. 14, Country B there are two eNBs (eNB1 and eNB2), one EPC and one IMS. In country B the SGW 1420 may connect to two VSATs (VSAT 1 and VSAT 2). Country A may have a remote PGW 1424 in country A (remote from country B) to route data from country B to the internet. Country B may have a local PGW 1420 in country B (local to country B) to route voice calls from the IMS to the UT.

For the cellular system 1400, a UT may be assigned two IP addresses corresponding to the two PGWs 1422 and 1424. As such, each UT may be provided two APNs, one per PGW. A first IP address is assigned by the PGW 1422 local to country B, and one IP address is assigned to UT of country B by the remote PGW 1424 (remote PGW can be in a different country such as country A). in exemplary embodiments, the local PGW 1422 is located in between the VSAT GW B and a MGW in country B. In some embodiments, the local PGW 1422 is located in between the SGW 1420 and VSAT 1 (not shown in FIG. 14) in country B.

Data traffic from UT in country B is routed to the remote PGW 1424 in Country A using a satellite backhaul 1410. The satellite backhaul 1410 may include satellite links. In FIG. 14, a satellite link for transporting data traffic is illustrated with a dashed line, and a satellite link for transporting voice traffic is illustrated with a solid line. Every SGW 1420 in Country B may have S5 and S8 interfaces simultaneously for each UT. S5 is the interface between the SGW and the local PGW 1420. The PGW 1420 may be in country B. In some embodiments, eNB1 may have to communicate with the local PGW 1420 via the satellite backhaul 1410. The S8 is an interface between the local SGW 1420 and the remote PGW 1424. The remote PGW 1424 may be disposed in a different country, i.e., the S8 is an interface between the SGW 1420 in the Country B and the PGW 1424 in Country A.

Figure 15:
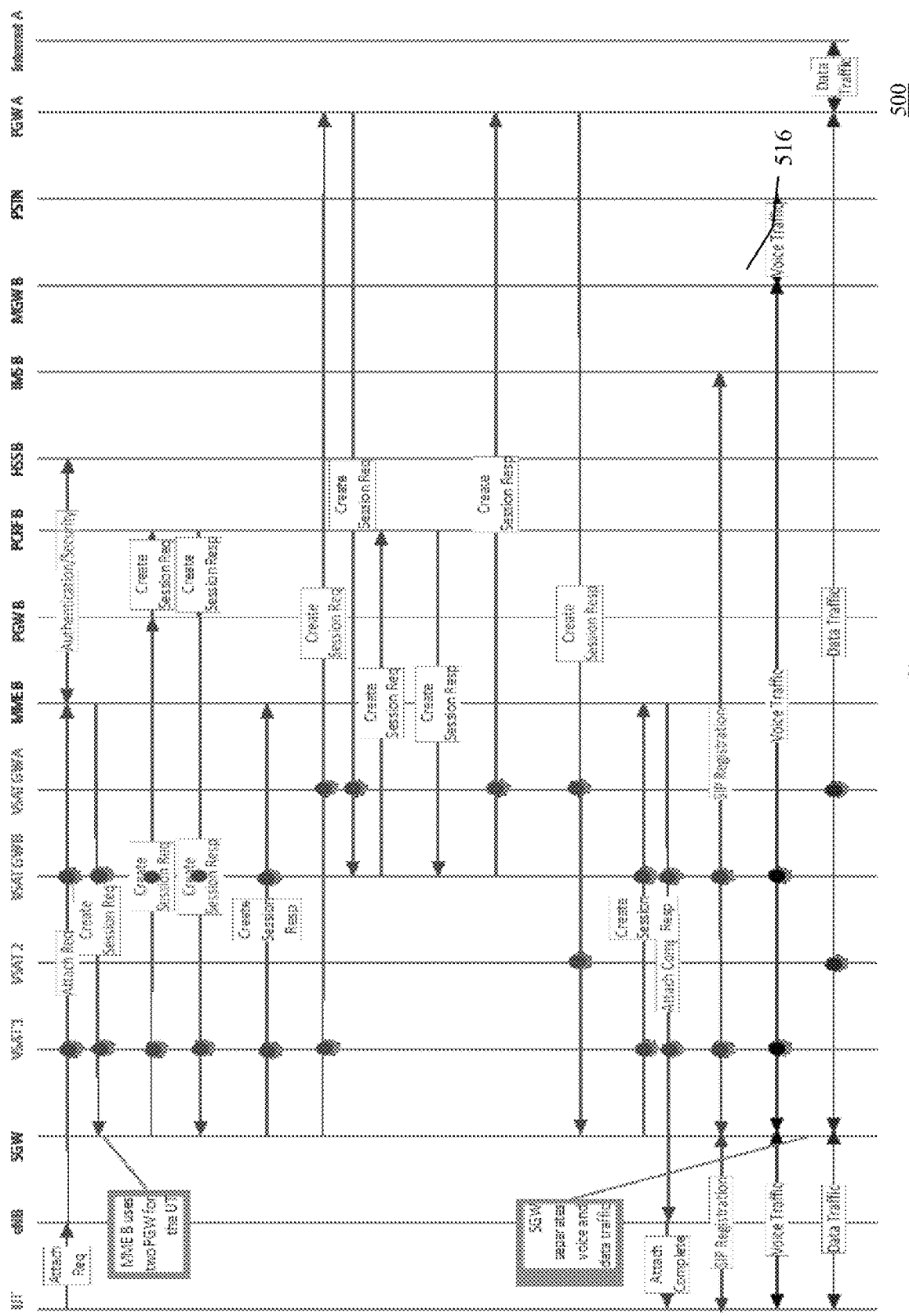
FIG. 15 illustrates UT signaling for a cellular system of FIG. 14 according to various embodiments.

FIG. 15 illustrates UT registration for a cellular system of FIG. 14 according to various embodiments.

During the attach process (see FIG. 15) the MME B consults the HSS B to get the UT subscription profile. The UT in its profile includes two default APNs, i.e. two PGWs, one is in Country B and the other one is in Country A.

In some embodiments, when the UT sends an Attach message, the UT includes two APNs, i.e., two PGWs, one in Country B and another one in Country A. In this case, the UT profile in the HSS does not need to be specified with default APNs.

During the Attach process, the SGW sends a Create Session request to the local and remote PGWs. For connection with the local PGW, the default and dedicated bearers for the UT for voice traffic may be defined in the PCRF B which then pushes it to the local PGW. An S5 interface is established between SGW and local PGW.

When connecting with the remote PGW, the remote PGW receives a Create Session request from the SGW and the PGW gets the UT profile from the PCRF B because the UT profile is defined in PCRF B. The PGW may create the default and dedicated bearers for the UT for data traffic. The PCRF B then pushes the UT profile to the remote PGW. An S8 interface is established between the SGW and the remote PGW.

In some embodiments, UTs in country B might also have their profiles defined in a PCRF in country A so that the remote PGW does not need to contact the local PCRF B. This solution might put a burden on the PCRF in country A as many UTs in different countries might need to have their profiles stored in the PCRF in country A.

After the UT attaches to the EPC network, the UT registers to the IMS in Country B so that the UT can start a Voice over LTE (VoLTE) session or receive a VoLTE incoming call.

The SGW determines the traffic type from a UT. For data traffic, The SGW routes the UT traffic to PGW in Country A through the VSAT2 in country B as it is communicating with VSAT GW A in Country A. VSAT GW A in Country A may forward this traffic to the PGW in Country A. For data traffic that comes from the Internet, the PGW in Country A inspects the UT destination IP address. The PGW then forwards the incoming data to the VSAT GW A that in turn transports the data to the UT in Country B.

For voice traffic, the SGW routes the UT traffic to the PGW in Country B through VSAT1 in country B that communicates with VSAT GW B in Country B. VSAT GW B in Country B may forward the voice traffic to the PGW in Country B which in turn forwards the voice traffic to the MGW in the same country.

Figure 16:
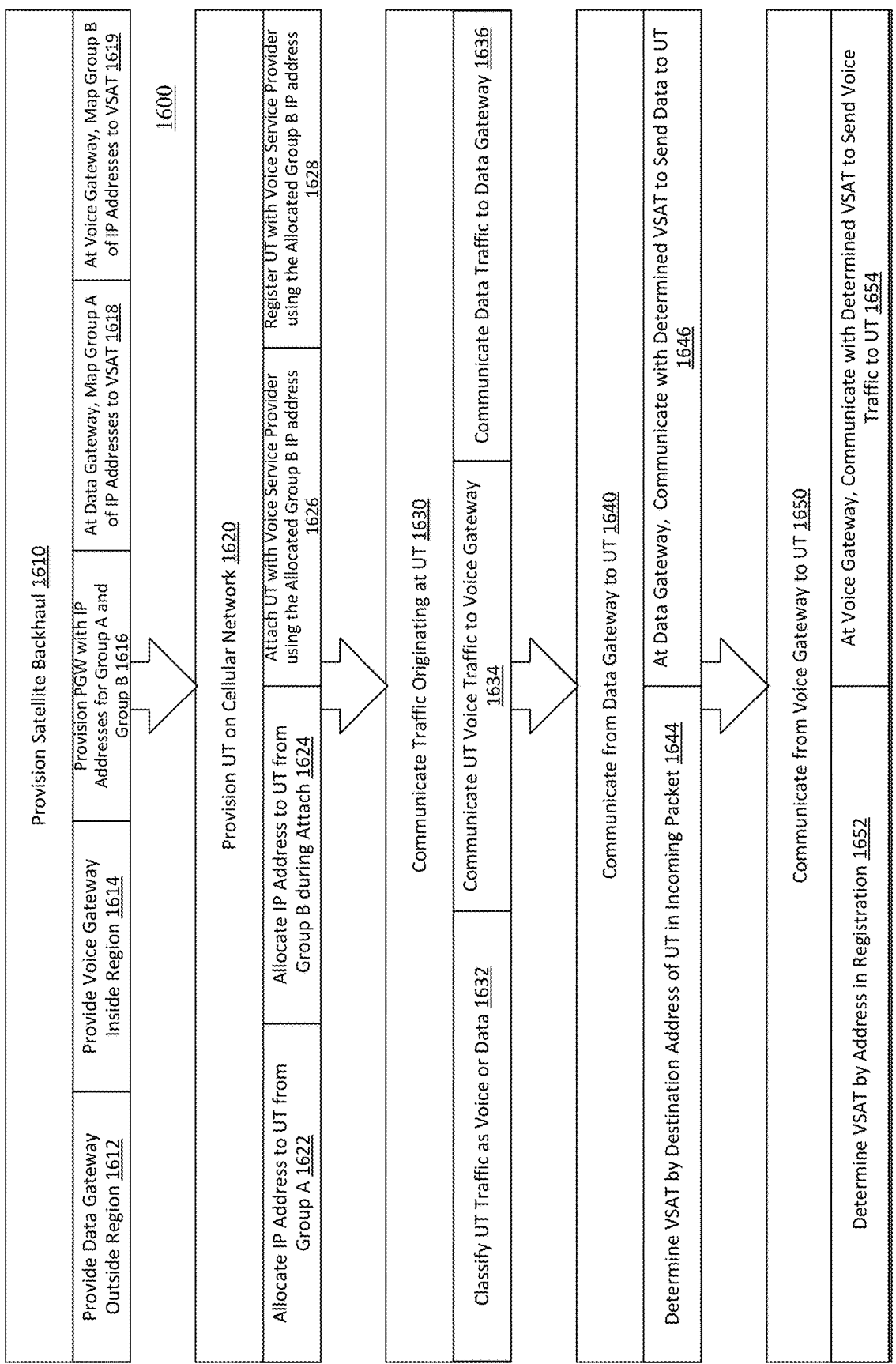
FIG. 16 illustrates a flowchart of an exemplary method for providing voice and data services to a user terminal of a cellular system according to various embodiments.

FIG. 16 illustrates a flowchart of an exemplary method for providing voice and data services to a user terminal of a cellular system according to various embodiments.

The present teachings provide a method 1600 for providing voice and data services to a user terminal of a cellular system. The method 1600 provides for communicating voice traffic separate from data traffic when using a satellite backhaul with a cellular base station.

In exemplary embodiments, the method 1600 includes operation 1612 to provide a satellite data gateway outside a region where a cellular base station is deployed. The method 1600 may include operation 1614 to provide a satellite voice gateway inside the region where the cellular base station is deployed. The method 1600 may include operation 1616 to provision a PGW with IP addresses for group A and group B. The method 1600 may include operation 1618 to map group A of IP addresses to a VSAT at the satellite data gateway. The method 1600 may include operation 1619 to map group B of IP addresses to VSAT at the satellite voice gateway.

In exemplary embodiments, the method 1600 includes operation 1620 to provision a UT on cellular network. The method 1600 may include operation 1622 to allocate an IP address to a UT from group A. The method 1600 may include operation 1624 to allocate an IP address to the UT from group B during attach. The method 1600 may include operation 1626 to attach the UT with a voice service provider using the allocated group B IP address. The method 1600 may include operation 1628 to register the UT with the voice service provider using the allocated group B IP address.

In exemplary embodiments, the method 1600 includes operation 1630 to communicate traffic originating at the UT. The method 1600 may include operation 1632 to classify the UT traffic as voice or data. The method 1600 may include operation 1634 to communicate the UT voice traffic to the satellite voice gateway. The method 1600 may include operation 1636 to communicate the data traffic to the satellite data gateway.

In exemplary embodiments, the method 1600 includes operation 1640 to communicate from the satellite data gateway to the UT. The method 1600 may include operation 1644 to determine the VSAT by the destination address of the UT in the incoming packet. The method 1600 may include operation 1646 to communicate with the determined VSAT to send data to the UT.

In exemplary embodiments, the method 1600 includes operation 1650 to communicate from the satellite voice gateway to the UT. The method 1600 may include operation 1652 to determine the VSAT by its address in registration. The method 1600 may include operation 1654 to communicate with the determined VSAT to send voice traffic to the UT.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A cellular system to provide voice and data services to a user terminal, the cellular system comprising:
    a cellular base station;
    a satellite backhaul comprising a first satellite link and a second satellite link; and
    a traffic classifier, connected to and co-located with the cellular base station, to classify traffic from the cellular base station as voice traffic for transportation via the first satellite link to a satellite voice gateway and as data traffic for transportation via the second satellite link to a satellite data gateway,
    wherein the cellular network comprises an Evolved Packet Core (EPC) Core Network (CN) comprising a Serving Gateway (SGW), a PGW, a Mobility Management Entity (MME), a PCRF, and a Home Subscriber Server (HSS), and
    the cellular base station communicates with an IP Multimedia Sub-system (IMS) via the first satellite link and an Internet Gateway over the second satellite link.

2. The system of claim 1, wherein the voice traffic is communicated within a first region by the first satellite link and the data traffic communicated to a second region different from the first region.

3. The system of claim 2, wherein the first region is disposed in a first country, and the second region is disposed in a second country different from the first country.

4. The system of claim 1, wherein the cellular base station is co-located with a transceiver to provide the first satellite link.

5. The system of claim 1, wherein the cellular base station comprises an LTE eNB.

6. The system of claim 1, further comprising a Serving Gateway (SGW) or a PDN (Packet Data Network) Gateway (PGW), wherein either the SGW or the PGW comprises the traffic classifier.

7. The system of claim 1, further comprising a PGW to support a UT handover from the PGW to a target PGW, to transfer a UT context at the PGW to the target PGW and to keep active a UT session during and after the UT handover.

8. The system of claim 1, wherein the cellular base station communicates with the SGW, the PGW, the PCRF, and the MME without using the first satellite link, and
    the cellular base station communicates with the HSS via the first satellite link.

9. The system of claim 1, wherein the cellular base station communicates with the SGW and the PGW without using the first satellite link, and
    the cellular base station communicates with the MME, the PCRF, and the HSS via the first satellite link.

10. The system of claim 1, wherein a UT is allocated two Access Point Names (APNs) with one APN for use by a local PGW and the other APN for use by a remote PGW.

11. The system of claim 1, wherein the satellite voice gateway is different than the satellite data gateway.

12. A method for providing voice and data services to a user terminal of a cellular system, the method comprising:
    providing a cellular base station;
    providing a satellite backhaul comprising a first satellite link and a second satellite link;
    classifying traffic from the cellular base station as voice traffic or data traffic; and
    transporting the voice traffic via the first satellite link to a satellite voice gateway and the data traffic via the second satellite link to a satellite data gateway,
    wherein the cellular network comprises an Evolved Packet Core (EPC) Core Network (CN) comprising a Serving Gateway (SGW), a PGW, a Mobility Management Entity (MME), a PCRF, and a Home Subscriber Server (HSS), and
    the cellular base station communicates with an IP Multimedia Subsystem (IMS) via the first satellite link and an Internet Gateway over the second satellite link.

13. The method of claim 12, wherein the voice traffic is communicated within a first region by the first satellite link and the data traffic is communicated to a second region different from the first region.

14. The method of claim 13, wherein the first region is disposed in a first country, and the second region is disposed in a second country different from the first country.

15. The method of claim 12, wherein the cellular base station is co-located with a transceiver to provide the first satellite link.

16. The method of claim 12, wherein the cellular base station comprises an LTE eNB.

17. The method of claim 12, wherein the traffic classifier is disposed in a Serving Gateway (SGW) or a PDN (Packet Data Network) Gateway (PGW).

18. The method of claim 12, providing a PGW to support a UT handover from the PGW to a target PGW, to transfer a UT context at the PGW to the target PGW and to keep active a UT session during and after the UT handover.

19. The method of claim 12, wherein the cellular base station communicates with the SGW, the PGW, the PCRF, and the MME without using the first satellite link, and
    the cellular base station communicates with the HSS via the first satellite link.

20. The method of claim 12, wherein the cellular base station communicates with the SGW and the PGW without using the first satellite link, and
    the cellular base station communicates with the MME, the PCRF, and the HSS via the first satellite link.

21. The method of claim 12, further comprising allocating two Access Point Names (APNs) to a UT with one APN for use by a local PGW and the other APN for use by a remote PGW.

\* \* \* \* \*